April 2, 1968     A. W. ENGLE ETAL     3,375,897
WAVEFORM CONVERTER FOR ACOUSTIC WELL LOGGING TOOLS
Original Filed Jan. 16, 1959

INVENTORS
ALLEN W. ENGLE,
JOHN L. CASEY, &
ADRIAN P. BROKAW

BY Robert K. Schumacher
ATTORNEY

United States Patent Office 3,375,897
Patented Apr. 2, 1968

3,375,897
WAVEFORM CONVERTER FOR ACOUSTIC WELL LOGGING TOOLS
Allen W. Engle, John L. Casey, and Adrian P. Brokaw, Tulsa, Okla., assignors, by mesne assignments, to Dresser Industries, Inc., Dallas, Tex., a corporation of Delaware
Continuation of application Ser. No. 787,214, Jan. 16, 1959. This application Aug. 25, 1967, Ser. No. 663,445
4 Claims. (Cl. 181—.5)

ABSTRACT OF THE DISCLOSURE

A pair of acoustic receivers are trailingly spaced from a single acoustic transmitter. The first receiver circuit is opened after a predetermined delay from the time of the acoustic pulse from the transmitter and closed upon the receipt of the pulse. The second receiver circuit, being responsive to the first receiver circuit, is opened after a predetermined delay from the time the acoustic pulse is received in the first receiver circuit and closed at a predetermined time after opening.

---

This application is a continuation of application Ser. No. 787,214, filed Jan. 16, 1959, now abandoned.

The present invention relates to an improved waveform converter for acoustic well logging tools, and more particularly the invention pertains to a waveform converter for acoustic well logging tools having means for conditioning the acoustic logging tool to become operative for an interval of time when the receiving transducer may be expected to receive information.

Specifically, the present invention relates to acoustic well logging tools having an information analyzer for generating a sharp pulse of acoustic energy for transmission through a medium, detecting the passing of the pulse energy at two different points in the medium, developing a pulse signal responsive to the receiving of the pulse energy at detectors or receiving means, and conditioning the receiving means for accepting the pulse energy in the medium only during predetermined time intervals. The invention has particular reference to an improved system for making bore hole surveys in which primary physical properties of the rocks are measured, such as the acoustic properties which depend on elasticity, state of aggregation, porosity, etc., of the rock, and are much less affected by conditions of the rock due to presence of brine. "Rock" is used herein as in its geological sense including sand, shale clay beds, etc., as well as hard rock.

In prior art devices, acoustic logging tools are known to be subject to a substantial amount of extraneous noise due to certain external sources, such as "road noise" caused by a logging tool instrument or a cable supporting the tool striking the side of the bore hole to generate noise thereby.

Accordingly, the present invention is directed to an analyzer for accepting two acoustic signals generated by the passage of acoustic energy through a medium adjacent and between two receiving elements, which acoustic signals generate two output signals responsive to the time interval during which the acoustic energy passes through the medium adjacent and between the two receiving elements. These output signals have a sharp leading wavefront and contain sufficient amplitude to traverse a well logging cable in a bore hole from the tool to a recording or utilization device on the earth's surface.

The sharp leading wavefront of these two signals is initiated by the reception of the first indication of the acoustic energy received at each of the receiving means. Output signals are generated to be responsive to either the first half cycle of the received acoustic signal, or to the second half cycle thereof.

The invention also provides a system for amplifying those portions of the acoustic energy that have been transformed or transduced to electrical signals by the receiving transducers to a level in amplitude sufficient to traverse a well logging cable.

It is therefore the object of the invention to provide an information analyzer system for receiving acoustic signals occurring within a specified time interval. The time interval begins shortly after the generation of a pulse of acoustic energy and terminates after a time lapse determined by the longest determined time required for the pulse of acoustic energy to be received by the information analyzer system. More specifically, the time interval begins before or at the time required for a pulse of acoustic energy to pass through the highest velocity medium normally encountered when the system is in use, and ends at or after the time required for the pulse of acoustic energy to pass through the lowest velocity medium normally encountered.

The presentation of the received pulse energy from the acoustic logging tool upon an oscilloscope at the earth's surface is a typical oscillogram known as the "formation signature." As pointed out in "Continuous Velocity Logging," by G. C. Summers and R. A. Broding, Geophysics, vol. XVII, No. 3 (July 1952), at pp. 602 and 603, the velocity is high enough that the separation of the received energy forming the "formation signature" into its three major components is apparent. The formation component, having a frequency of about eleven kilocycles, has traveled at formation bulk velocity. The second arrival, composed of much high frequency energy, has travelled at a velocity of about 5,000 feet per second. This has been tentatively identified as the bulk compressional velocity of the drilling fluid. The third major component, composed of lower frequency energy, has travelled at a velocity of about 3,700 feet per second and relates to the velocity of a wave in a tube affected by the elasticity or shear modulus of the wall. It is therefore an object of the invention to record the "formation signature" and measure the time interval that is required for the "formation signature" to travel through a definite distance in a medium and to minimize effects of "road noise" and other acoustic phenomena generating spurious signals received by an acoustic logging tool.

It is a further object of the invention to provide a system for measuring the velocity of acoustic energy in formations surrounding bore holes.

Also, it is an object of the invention to provide a system having the advantage of rejecting spurious acoustic signals outside of the intervals during which acoustic signals are expected to be received.

It is still another object of the invention to provide a system for transmitting a portion of one of a pair of received signals, and all of the other received signals to the earth's surface where they may be recorded and examined.

It is still another object of the invention to provide a system to convert to output signals, the acoustic energy passing between two points in a medium responsive to the interval in time for the acoustic energy to pass between the two points.

One of the most important applications of the new system is to produce pulses responsive to the interval in time for acoustic energy to pass between two points in a medium without measuring or recording the surrounding noise therein.

The above and other objects and advantages of the invention will become apparent upon full consideration of the following detailed description and accompanying drawings in which.

Figure 1:
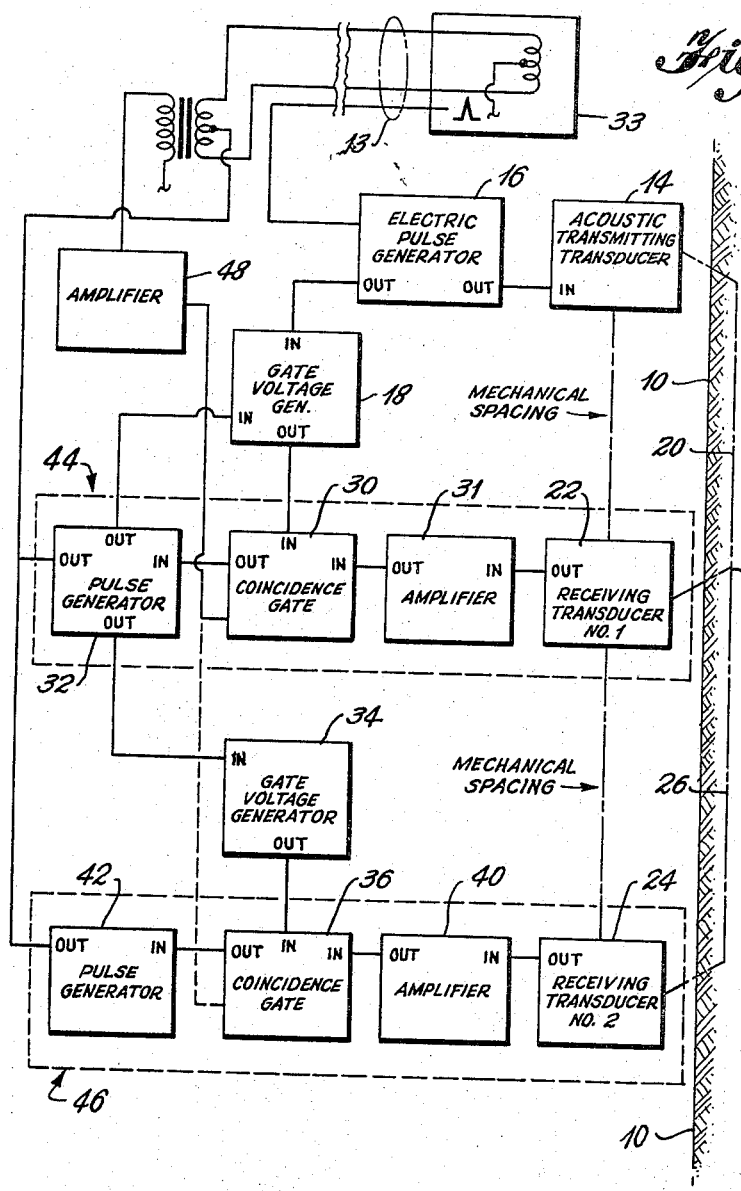
FIG. 1 is a schematic block diagram showing the details of the system as related to a cross-sectional view of a bore hole in which a pulse of acoustic energy is propagated in accordance with one embodiment of the invention.
Figure 3:
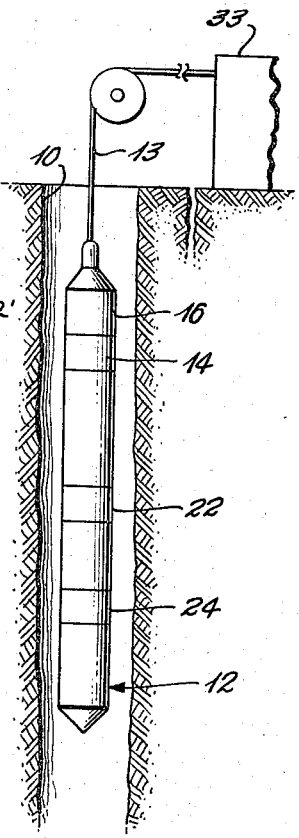
FIG. 3 is a diagrammatic view of an acoustic logging tool in a well bore hole according to the present invention.
Figure 2:
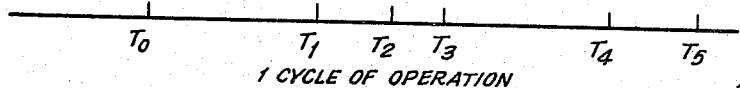
FIG. 2 is a chart illustrating the relationship in time of the transmitted and received pulses of energy using the method and apparatus according to the invention.

Referring to FIGS. 1 and 3, there is shown a well bore hole 10 extending downward from the surface of the earth through various strata. There is only one stratum shown although there may be several different strata throughout the length of the bore hole. Within the bore hole, there is a tool 12 which has been lowered down into the bore hole by means of a supporting cable 13 (FIG. 3). Positioned toward one end of the tool 12 is a transmitting transducer 14 for transmitting acoustic energy from the transmitting transducer into the bore hole 10. The transmitting transducer may be a magnetostrictive type transducer or may be a piezoelectric type transducer, as are well known. The transmitting transducer receives pulse signals from an electrical pulse generator 16 providing sufficient energy to drive the transmitting transducer. The acoustic pulse energy emanating from the transmitting transducer passes into and longitudinally along the bore hole 10. The time at which the energy emanates from the transmitter transducer is shown in FIG. 2 as $T_0$.

The electrical pulse generator 16 also provides an electrical pulse coupled to a gate voltage generator 18. The acoustic energy from the transmitting transducer is emanated in a principally radial direction from the transducer. The energy received by a first receiving transducer 22 passes particularly along a path 20. The energy received by a final receiving transducer 24 passes particularly along a path 26. They go along a common path from element 14 to point 22'.

The first receiving transducer and the final receiving transducer are basically constructed similar to the transmitting transducer and may therefore be of a magnetostrictive type transducer or a piezoelectric type transducer. Between the transmitting transducer 14 and the first receiving transducer 22, there is a specified mechanical spacing and a similar mechanical spacing exists between the first receiving transducer 22 and the final receiving transducer 24.

Simultaneously with the pulse signal provided to the transmitting transducer, the electrical pulse generator 18 provides a pulse signal to a gate voltage generator 18 which after a predetermined interval of, for example, 100 microseconds produces a voltage change at the output thereof opening a coincidence gate 30. The output voltage of the gate voltage generator is delayed in order to permit certain electrical transients appearing when the acoustic pulse is generated at the transmitting transducer 14 to dissipate before the coincidence gate 30 is opened. This predetermined interval of time is calculated by the time interval required for acoustic energy to pass from the transmitting transducer 14 to the first receiving transducer 22 by way of an idealized high velocity medium. The pulse transmitted from the transmitting transducer is transmitted at time $T_0$. The shortest possible time required for the energy to be received at the receiving transducer 22 through the idealized high velocity medium is time $T_1$. The gate may be delayed for a slightly shorter time than $T_1$. The first pulse of acoustic energy to be received at the first receiving transducer 22 is at time $T_2$, which is necessarily after time $T_1$. The first receiving transducer converts the acoustic energy received by it into an electrical signal representative of the received acoustic energy. The electrical signal is fed to an amplifier 31 of conventional design and after amplification the signal is fed to or coupled to the coincidence gate 30. The coincidence gate, having been in an "on" condition since before time $T_1$, now passes the amplified electric signal from amplifier 31 from the coincidence gate 30 to a pulse generator 32. The pulse generator 32 produces an output signal upon receiving the first received signal and is thereafter insensitive to further inputs for a period sufficient to let these inputs decay. The one output signal produced by the pulse generator is coupled to a balanced line within the supporting cable 13 and is thence transmitted to the earth's surface measuring equipment 33. A portion of this same output signal from pulse generator 32 is coupled to the gate voltage generator 18 to change its output voltage to its original condition which in turn closes the coincidence gate 30 at time $T_3$ and preventing the passage of subsequent signals to the pulse generator 32 until the next appropriate interval cycle of received acoustic energy. A further portion of the output signal from the pulse generator 32 is coupled to a gate voltage generator 34 for producing a delayed voltage signal or change-in-voltage thereof which opens a gate 36. The gate voltage generator 34 may include an integrator and clamp of conventional types. The length of the delay is equal to the shortest time interval required for acoustic energy passing through a high velocity medium for the distance between the first receiving transducer 22 and the second receiving transducer 24. The output signal or delayed signal from the gate voltage generator 34 opens the coincidence gate 36. As the initial acoustic energy from the transmitting transducer 14 progresses in the formation of the bore hole from or beyond the first receiving transducer 22 to the second receiving transducer 24, the acoustic energy reaches the second receiving transducer 24 at the time $T_5$. The coincidence gate 36 was gated "on" at time $T_4$, which necessarily was before time $T_5$. The acoustic energy received at the second receiving transducer 24 is converted into an electric signal responsive thereto and amplified by amplifier 40. The amplified signal is then coupled to the coincidence gate 36 where it passes therethrough since the coincidence gate is open. The signal passing through the coincidence gate 36 is thence coupled to a pulse generator 42 similar to the pulse generator 32. The pulse generator 42 produces a signal upon receiving the first received signal from the coincidence gate. It is insensitive to further inputs from the coincidence gate for a period sufficient to let the signal substantially decay.

It is within the scope of the invention to provide the system with means to actuate the pulse generators 32, and 42 upon either the first half cycle of the signal from the coincidence gates 30, and 36, or, in the alternative, upon the second half cycle thereof.

The output signal from the pulse generator 42 indicates the end of an interval of time commenced by the output signal from pulse generator 32. These two signals from generators 32, 42 separated by the interval developed by the circuitry connected with the first receiving transducer 22 and the second receiving transducer 24 are sent to the surface measuring equipment in similar manner.

The first receiving transducer 22, the amplifier 31, the coincidence gate 30, and the pulse generator 32 form an assembly known as a first information channel 44, and a second information channel 46, is comprised of a second receiving transducer 24, the amplifier 40, the coincidence gate 36 and the pulse generator 42. The information channels 44, 46 provide a signal in each channel, the signals in the two channels being separated by an interval of time required for sound or acoustic energy to pass along the bore hole formation between two points adjacent two acoustic energy receivers.

After a predetermined delay the gate voltage generator 34 in the second information channel 46 closes the coincidence gate automatically at a predetermined time after opening. The time is set to allow the entire "formation signature" to be received and transmitted to the surface.

An amplifier 48 may have its input coupled to either or both of coincidence gates 30, 36 so that the amplifier 48 may couple an amplified signal of the formation signature received by the respective information channels to the earth's surface measuring equipment for inspection and recording.

The apparatus of the present invention is also highly advantageous in lending precision to the derivation and transmission of signals responsive to the received energy in each of the information channels so that there is greater precision in the information carried by the interval between the two respective signals.

It should be understood, however, that the system herein illustrated and described is intended to be representative only, as many changes may be made therein without departing from the clear teachings of the invention. Accordingly, reference should be made to the following claims in determining the full scope of the invention.

We claim:

1. An acoustic well logging system, comprising:
   a transmitting transducer for generating acoustic energy in a medium when actuated,
   means coupled to said transmitting transducer for actuation thereof,
   a first openable information circuit including a first receiving transducer disposed in fixed relationship with respect to said transmitting transducer and responsive to acoustic energy propagated from said transmitting transducer through the medium adjacent said first receiving transducer for producing a first output signal from said first openable information circuit,
   a second openable information circuit including a second receiving transducer disposed in fixed relationship with respect to said first receiving transducer and responsive to acoustic energy propagated from said transmitting transducer through the medium adjacent said second receiving transducer for producing a second output signal from said second openable information circuit,
   a first delayed action gating means responsive to actuation of said transmitting transducer to open said first openable information circuit after a predetermined delay,
   a second delayed action gating means responsive to said first output signal to open said second openable information circuit after a predetermined delay,
   means also responsive to said first output signal to close said first openable information circuit,
   transmission means,
   means interconnected with said first and second openable information circuits to couple said first and second output signals to said transmission means,
   means interconnected between one of said information circuits and said transmission means for deriving from one of said one information circuit and independently of said first and second output signals a third output signal which is characteristic of at least a portion of the acoustic pattern of said acoustic energy traveling said medium, and
   means coupled to said transmission means remotely of said information circuits for receiving and utilizing said output signals.

2. An acoustic well logging system, comprising:
   a transmitting transducer for generating acoustic energy in a medium when actuated,
   means coupled to said transmitting transducer for actuation thereof,
   a first openable information circuit including a first receiving transducer disposed in fixed relationship with respect to said transmitting transducer and responsive to acoustic energy propagated from said transmitting transducer through the medium adjacent said first receiving transducer for producing a first output signal from said first openable information circuit,
   a second openable information circuit including a second receiving transducer disposed in fixed relationship with respect to said first receiving transducer and responsive to acoustic energy propagated from said transmitting transducer through the medium adjacent said second receiving transducer for producing a second output signal from said second openable information circuit,
   a first delayed action gating means responsive to actuation of said transmitting transducer to open said first openable information circuit after a predetermined delay,
   a second delayed action gating means responsive to said first output signal to open said second openable information circuit after a predetermined delay,
   means also responsive to said first output signal to close said first openable information circuit,
   transmission means,
   means interconnected with said first and second openable information circuits to couple said first and second output signals to said transmission means,
   an amplifier connected to said transmission means,
   means interconnected with said first information circuit for deriving and applying to said amplifier a third output signal which is independent of said first output signal and which is characteristic of at least a portion of the acoustic pattern of said acoustic energy traveling in said medium, and
   means interconnected with said second information circuit for deriving and applying to said amplifier a fourth output signal which is independent of said second output signal and which is characteristic of the acoustic pattern of said acoustic energy traveling in said medium.

3. An acoustic well logging system for increasing the precision in the information carried by the interval between two received signals, comprising:
   a transmitting transducer for generating acoustic energy in a medium when actuated,
   means coupled to said transmitting transducer for actuating said transducer,
   a first openable information circuit including a first receiving transducer disposed in fixed spacial relationship relative to said transmitting transducer and responsive to acoustic energy from said transmitting transducer propagated through the medium adjacent said first receiving transducer for producing a first output signal from said first openable information circuit,
   a second openable information circuit including a second receiving transducer disposed in fixed spacial relationship relative to said first receiving transducer and responsive to acoustic energy from said transmitting transducer propagated through the medium adjacent said second receiving transducer for producing a second output signal from said second openable information circuit,
   first gate means responsive to the actuation of said transmitting transducer to open said openable information circuit after a predetermined delay determined by the time interval equal to the shortest time interval required by a pulse of acoustic energy to pass from the transmitting transducer to said first receiving transducer through the highest velocity medium normally encountered when the system is in use,
   second gate means responsive to said first output signal to open said second openable information circuit after a predetermined delay determined by the time interval equal to the shortest time interval required for acoustic energy passing through a high velocity medium for the distance between said first receiving transducer and said second receiving transducer, means also responsive to said first output signal to close said first openable information circuit, means to close said second openable information circuit at a predetermined time after opening determined by the time interval equal to the longest time interval required by a pulse of acoustic energy to pass from said first receiving transducer to said second receiving transducer through the lowest velocity medium normally encountered when the system is in use, transmission means, and means interconnected with said first and second openable information circuits to couple said first and second output signals to said transmission means.

4. An acoustic well logging system for increasing the precision in the information carried by the interval between two received signals as set forth in claim 3 wherein said first openable information circuit and said second openable information circuit are responsive only to at least a portion of the first cycle of a received signal after each responsive circuit is opened.

References Cited

UNITED STATES PATENTS

| 2,704,364 | 3/1955 | Summers | 181—.5 |
| 2,907,027 | 9/1959 | Uskavitch | 343—17.1 |
| 2,938,592 | 5/1960 | Charske et al. | 181—.5 |

BENJAMIN A. BORCHELT, *Primary Examiner.*

R. M. SKOLNIK, W. KUJAWA, *Assistant Examiners.*